Dec. 8, 1970 TOSHI SUZUKI ET AL 3,545,077

METHOD OF MAKING MULTIPLE-ELEMENT MAGNETIC HEAD

Filed Dec. 2, 1968 3 Sheets-Sheet 1

INVENTORS
TOSHI SUZUKI
TSUTOMU NISHIJIMA

BY Stevens, Davis, Miller & Mosher
ATTORNEYS

INVENTORS
TOSHI SUZUKI
TSUTOMU NISHIJIMA
BY Stevens, Davis, Miller & Mosher
ATTORNEYS Dec. 8, 1970 TOSHI SUZUKI ET AL 3,545,077

METHOD OF MAKING MULTIPLE-ELEMENT MAGNETIC HEAD

Filed Dec. 2, 1968 3 Sheets-Sheet 3

INVENTORS
TOSHI SUZUKI
TSUTOMU NISHIJIMA

BY Stevens, Davis, Miller & Mosher

ATTORNEYS

United States Patent Office 3,545,077
Patented Dec. 8, 1970

3,545,077
METHOD OF MAKING MULTIPLE-ELEMENT MAGNETIC HEAD

Toshi Suzuki, Kamakura, and Tsutomu Nishijima, Yokohama, Japan, assignors to Victor Company of Japan, Limited, Yokohama, Japan Filed Dec. 2, 1968, Ser. No. 780,393
Claims priority, application Japan, Dec. 4, 1967, 42/77,390
Int. Cl. H01f 7/06
U.S. Cl. 29—603 3 Claims

ABSTRACT OF THE DISCLOSURE

A multiple-element magnetic head comprising a plurality of magnetic head half-members arranged in face to face relation with each other at opposing end surfaces, with magnetic gaps being formed between them. Such magnetic head half-members are each made by holding non-magnetic members of substantially inverted U-shape each including a horizontal portion and oppositely disposed vertical portions between magnetic members identical in shape and configuration with said non-magnetic members, holding the assembly between substantially U-shaped cores including a horizontal portion and oppositely disposed vertical portions, cutting off said horizontal portions of said non-magnetic members and said magnetic members while leaving said oppositely disposed vertical portions, and grinding end surfaces of said oppositely disposed vertical portions of the non-magnetic members and magnetic members at which the horizontal portions have been cut off so that said end surfaces may be flush with end surfaces of the cores which are to be positioned in face to face relation with end surfaces of cores of the other magnetic head half-member.

The present invention relates to multiple-element magnetic heads in general, and in particular the invention deals with a multiple-element magnetic head adapted for use with multichannel tape cartridge players and a method of making same.

A principal object of this invention is to provide a multiple-element magnetic head which can be readily made in a short interval of time and yet has good properties.

Another object of the invention is to provide a multiple-element magnetic head which permits to eliminate or reduce cross talk with respect to a given track width.

Still another object of the invention is to provide a method of making a multiple-element magnetic head which permits to fabricate an integral multiple-element magnetic head by first forming a plurality of magnetic head half-members, grinding surfaces of such half-members which are to be disposed in face to face relation with each other in assembling, and then arranging such half-members in face to face relation with each other at said ground surfaces.

Additional objects and advantages of the invention will become apparent from consideration of the description set forth hereunder when considered in conjunction with the accompanying drawings, in which:

FIGS. 1(A), 1(B), 1(C) and 1(D) are perspective views of various component parts of one embodiment of a multiple-element magnetic head according to this invention;

Figures 1, 2, 3:
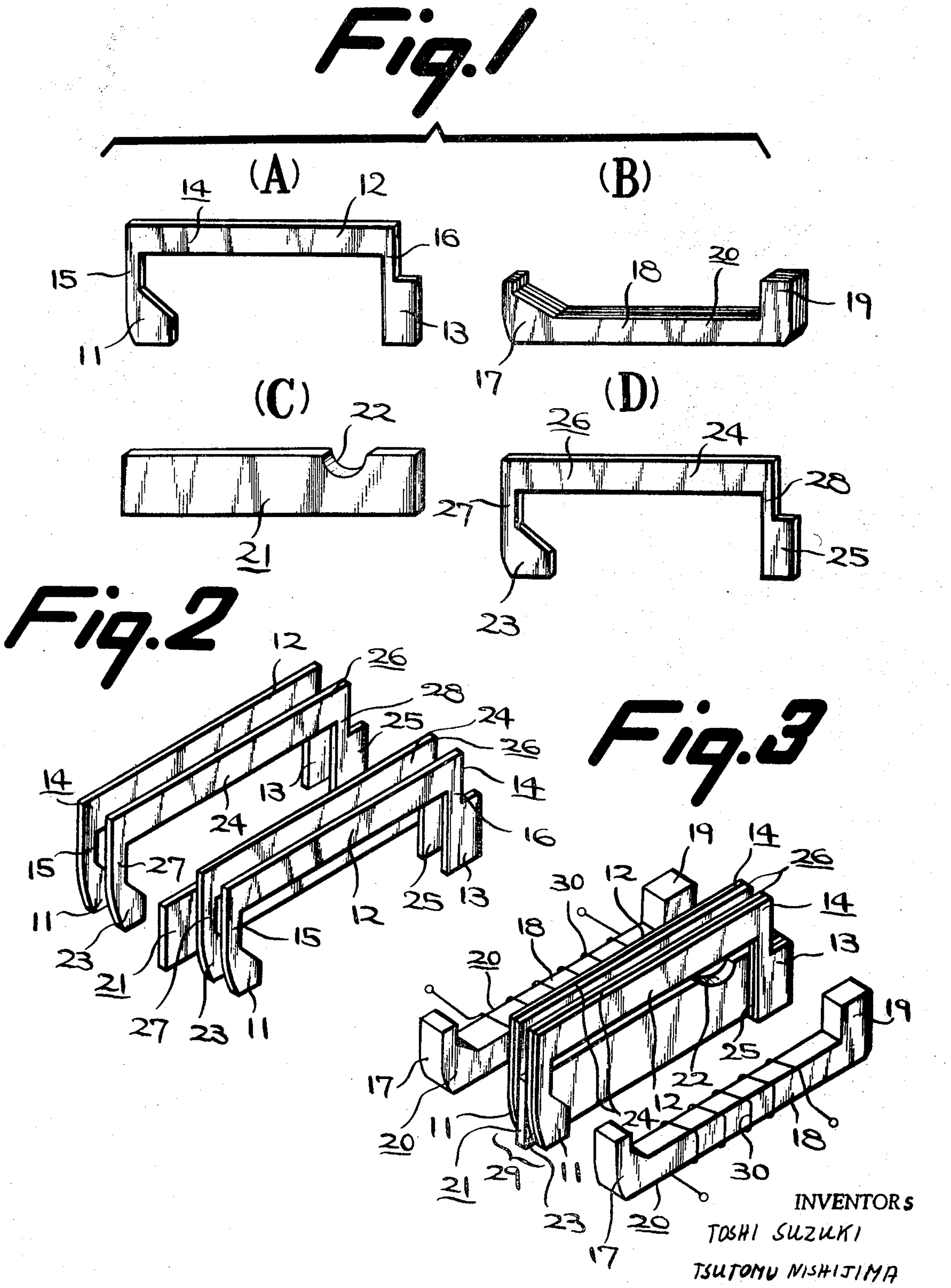
FIGS. 2 to 6 are perspective views showing one example of various operational steps of making a multiple-element magnetic head according to this invention.
Figure 4:
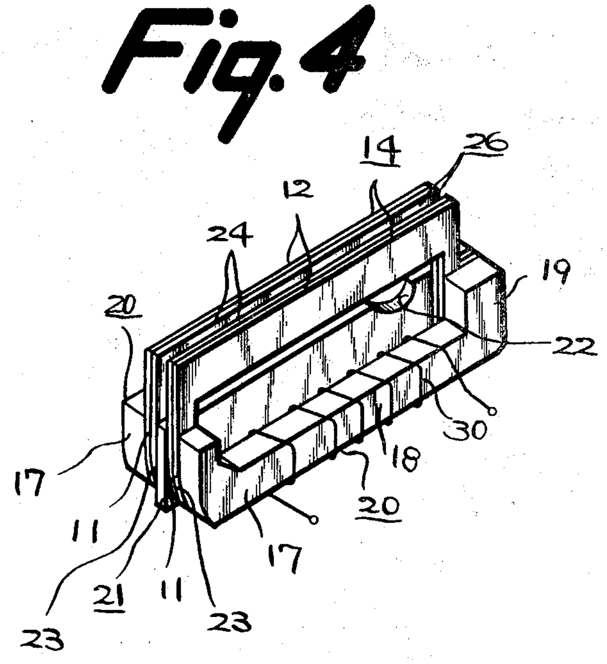

A multiple-element magnetic head for multichannels embodying the present invention will now be explained with reference to the drawings.

FIGS. 1(A), 1(B), 1(C) and 1(D) show component parts of one embodiment of a multiple-element magnetic head according to this invention. FIG. 1(A) shows a magnetic plate of substantially inverted U-shape 14 formed as of 78% Permalloy (0.09 mm. thick) and including a horizontal portion 12 and oppositely disposed vertical portions 11 and 13. The vertical portions 11 and 13 are formed with connecting portions 15 and 16 respectively which constitute the upper parts of the vertical members contiguous with the horizontal portion 12 and have a smaller thickness than other parts of the vertical portions so as to facilitate cutting therethrough as subsequently to be described. FIG. 1(B) shows a substantially U-shaped core 20 formed by bonding a plurality of 78% Permalloy plates (0.09 mm. thick), for example, with a bonding agent, such as Araldite XV, for example, to provide a laminate and including a horizontal portion 18 and oppositely disposed vertical portions 17 and 19. A coil 20$\mu$ in diameter) is wound on the horizontal member 18 in convolutions forming three layers in close contact with one another as subsequently to be described. Shown in FIG. 1(C) is a shield plate 21 rectangular in shape and made as of 78% Permalloy (0.1 mm. thick), said shield plate 21 being formed with a cut out 22 on one lateral edge thereof for passing lead wires for the coils therethrough. Shown in FIG. 1(D) is a non-magnetic plate 26 of substantially inverted U-shape identical in shape and configuration with said magnetic plate 14 of substantially inverted U-shape 14 made as of Phosphor bronze (0.09 mm. thick) and including a horizontal portion 24 and oppositely disposed vertical portions 23 and 25. The vertical portions 23 and 25 are formed with connecting portions 27 and 28 respectively which constitute the upper parts of the vertical portions contiguous with the horizontal portion 24 and have a smaller thickness than other parts of the vertical portion so as to facilitate cutting therethrough as subsequently to be described.

FIGS. 2 to 6 show one embodiment of a method of making a multiple-element magnetic head according to this invention.

FIG. 2 shows in an exploded view the arrangement of members to be laminated. In FIG. 2, one rectangular shield plate 21 is disposed in the center and two non-magnetic plates 26 of substantially inverted U-shape each including the horizontal portions 24 and oppositely disposed vertical portions 23 and 25 are each arranged on opposite sides of said shield plate. Two magnetic plates 14 of substantially inverted U-shape identical with said non-magnetic plates 26 and each including the horizontal portion 12 and oppositely disposed vertical portions 11 and 13 are each arranged on the opposite sides of said non-magnetic plates 26.

The shield plate 21, two non-magnetic plates 26 of substantially inverted U-shape and two magnetic plates 14 of substantially inverted U-shape arranged as aforementioned are bonded to one another with Aronalpha which is a monomer of alphacyanoacrylate, for example, to provide a laminate of integral structure which is generally designated 29 in FIG. 3.

Then, the two substantially U-shaped cores 20 each having a coil 30 wound on the horizontal portion 18 are arranged on opposite sides of the laminate 29.

Then, the laminate 29 is held by the two substantially U-shaped cores 20 on opposite sides, and they are bonded together with a bonding agent, such as said Aronalpha, for example, to form another laminate of integral structure.

Figure 5:
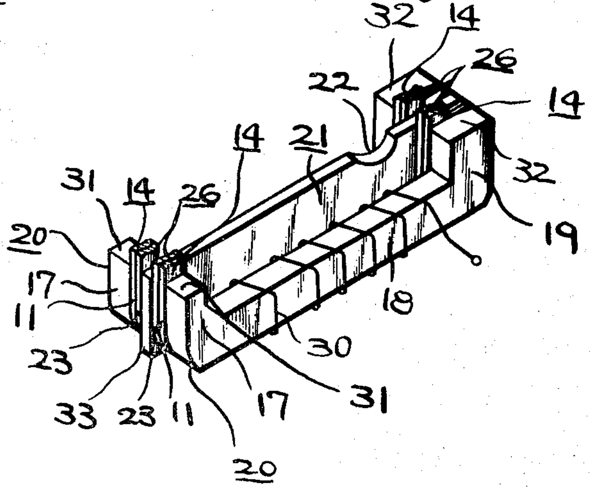

After said another laminate of integral structure is made, the horizontal portions 12 and 24 of the magnetic plates 14 of substantially inverted U-shape and non-magnetic plates 26 of substantially inverted U-shape respectively are cut off from the rest of the plates at the connecting portions 15, 16 and 27, as shown in FIG. 5.

Then, end surfaces of the connecting portions 15, 16, 27 and 28 at which the horizontal portions are cut off are ground so that they may be flush with end surfaces 31 and 32 of the oppositely disposed vertical portions which are to be disposed in face to face relation with each other when assembled. At the same time, corners 33 of the shield plate 21 are rounded by grinding.

A magnetic head half-member is formed by the steps described above.

Figure 6:
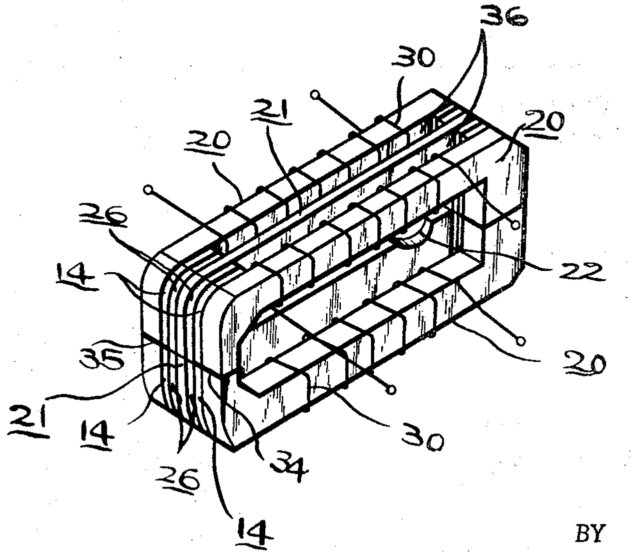

Two magnetic head half-members formed by the process explained above are arranged in face to face relation with each other at their respective opposing end surfaces with magnetic gaps 34 and 35 being disposed therebetween as shown in FIG. 6 to provide an assembled multiple-element magnetic head unit.

In the multiple-element magnetic head unit shown in FIG. 6, a gap formed between the substantially U-shaped core 20 and the magnetic plate 14 having its horizontal portion 12 cut off which are arranged on one side of one magnetic head half-member and the substantially U-shaped core 20 and the magnetic plate 14 having its horizontal portion 12 cut off which are arranged on one side of the other magnetic head half-member disposed in face to face relation with said one magnetic head half-member constitutes the magnetic head gap 34 of one element having a width proportionate to the thickness of said substantially U-shaped cores 20 and said magnetic plates 14. Similarly, a gap formed between the substantially U-shaped core 20 and the magnetic plate 14 having its horizontal portion 14 cut off which are arranged on the other side of said one magnetic head half-member and the substantially U-shaped core 20 and the magnetic plate 14 having its horizontal portion 12 cut off which are arranged on the other side of said the other magnetic head half-member disposed in face to face relation with said one magnetic head half-member constitutes the magnetic head gap 35 of the other element.

Spaces 36 which have a width corresponding to the thickness of the magnetic plate 14 plus the thickness of the non-magnetic plate 26 are defined by the horizontal portions 18 of the substantially U-shaped cores 20, the shield plates 21, the vertical members 11, 23 and the vertical members 13, 25.

Then, surfaces of the cores 20, the non-magnetic plates 26, the magnetic plates 14, and the shield plates 21 which are operatively brought into contact with a magnetic tape are ground.

The multiple-element magnetic head unit made as shown in FIG. 6 is then fitted in a groove 38 formed in a holder 37, and Epikote resin, for example, is poured in said holder 37 so as to fix the multiple-element magnetic head unit in place in the holder. Thus, the multiple-element magnetic head is completed.

Figure 7:
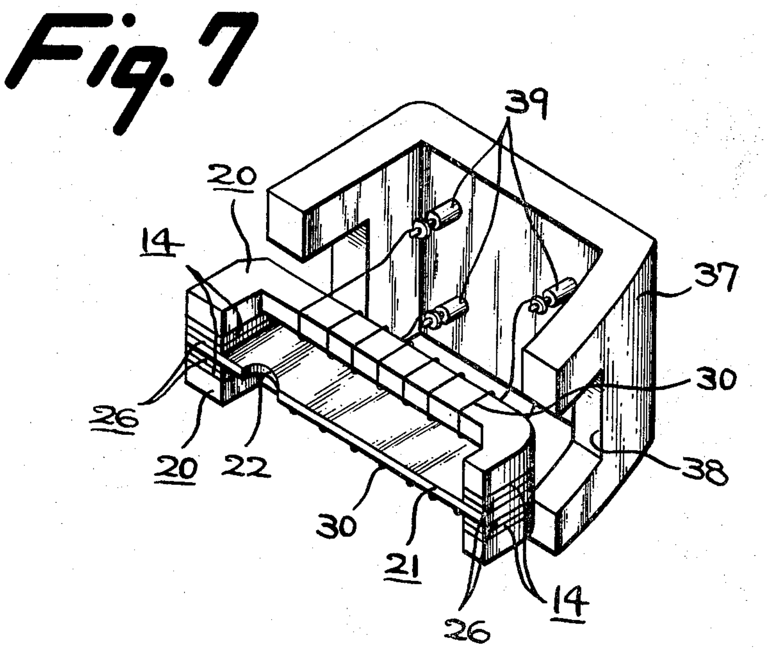
FIG. 7 is a perspective view of essential portions of a multiple-element magnetic head according to this invention, with certain parts being omitted.
Figure 8:
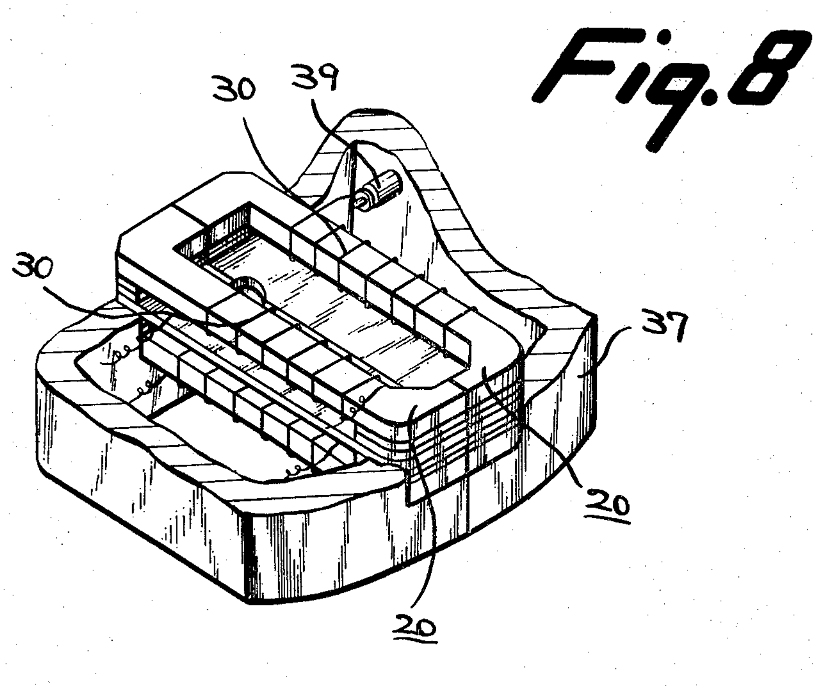
FIG. 8 is a perspective view, with certain parts being cut out, of a completed multiple-element magnetic head according to this invention.

FIGS. 7 and 8 show the completed multiple-element magnetic head as fixed in place in the holder. The holder 37 has a plurality of terminals 39 attached thereto to which are connected initial portions and end portions of said coils 30 wound on the cores 20.

From the foregoing description, it will be appreciated that in the multiple-element magnetic head embodying this invention, the width of a track recorded on a magnetic tape is equal to the width of the magnetic gap which is equal to the thickness of the magnetic plate 14 plus the thickness of the core 20. Since the coils 30 are wound only on the cores 20, however, the path of a turn of coil can be reduced, because coil windings are small in size as compared to the width of the magnetic gap even if a large number of turns of coil are formed by using a fine wire. This is conducive to reduced D.C. resistance in the coil and increased inductance. Also, the coils 30 wound on the cores 20 are spaced apart from each other, so that cross talk with respect to a given track width can be reduced or eliminated.

The magnetic plates 14 and non-magnetic plates 26 defining the space 36 between their forward ends and rearward ends have their forward ends and rearward ends integrally connected together by the intermediate portions prior to being made into a magnetic head half-member. This permits to readily arrange, in assembling, the end surfaces of the forward end portions adapted to come into contact with a magnetic tape and the end surfaces of the core adapted to come into contact with a magnetic tape in one vertical plane.

While the present invention has been shown and described with reference to a preferred embodiment thereof, it is to be understood that the invention is not to be limited to the precise form of the embodiment, and that many changes and modifications may be made therein without departing from the spirit and scope of the invention and the appended claims should therefore be interpreted to cover such changes and modifications.

What is claimed is:

1. A method of making a multiple-element magnetic head comprising the steps of bonding a plurality of non-magnetic members of substantially inverted U-shape each including a horizontal portion and oppositely disposed vertical portions to respective sides of a rectangular shield, bonding a plurality of magnetic members of substantially inverted U-shape identical with said non-magnetic members in shape and configuration to respective outer sides of said non-magnetic members, bonding a plurality of substantially U-shaped cores each including a horizontal portion with a coil wound thereon and oppositely disposed vertical portions to respective outer sides of said magnetic members in such a manner that said oppositely disposed vertical portions of said magnetic members and said oppositely disposed vertical portions of said cores are positioned against and aligned with each other, cutting off said horizontal portions of said non-magnetic members and said magnetic members, grinding end surfaces of the oppositely disposed vertical portions of said non-magnetic members and said magnetic members at which the horizontal portions have been cut off so as to bring said end surface flush with projecting end surfaces of said cores, and positioning a plurality of magnetic head half-members identical in shape and configuration which are made by the aforementioned steps in such a manner that their ground end surfaces are disposed in face to face relation with each other, magnetic gaps being formed therebetween.

2. A method of making a multiple-element magnetic head comprising the steps of bonding a plurality of non-magnetic members of substantially inverted U-shape each including a horizontal portion and oppositely disposed vertical portions to respective sides of a rectangular shield, bonding a plurality of magnetic members of substantially inverted U-shape identical with said non-magnetic member in shape and configuration to respective outer sides of said non-magnetic members, bonding a plurality of substantially U-shaped cores each including a horizontal portion with a coil wound thereon and oppositely disposed vertical portions to respective outer sides of said magnetic members in such a manner that said oppositely disposed vertical portions of said magnetic members and said oppositely disposed vertical portions of said cores are positioned against and aligned with each other, cutting off said horizontal portions of said non-magnetic members and said magnetic members, grinding end surfaces of the oppositely disposed vertical portions of said non-magnetic members and said magnetic members at which the horizontal portions have been cut off so as to bring said end surfaces flush with projecting end surfaces of said cores, positioning a plurality of magnetic head half-members identical in shape and configuration which are made by the aforementioned steps in such a manner that their ground end surfaces are disposed in face to face relation to each other, magnetic gaps being formed therebetween, and simultaneously grinding surfaces of said cores, said non-magnetic members, said magnetic members and said shield bonded together in each of said magnetic head half-members which are adapted to come into contact with a magnetic tape.

3. A method of making a multiple-element magnetic head comprising the steps of bonding a plurality of non-magnetic members of substantially inverted U-shape including a horizontal portion and oppositely disposed vertical portions to respective sides of a rectangular shield, said oppositely disposed vertical portions of said non-magnetic members being formed with connecting portions which constitute the upper parts thereof contiguous with the horizontal portion and having a smaller thickness than other parts of the vertical portions so as to facilitate cutting therethrough, bonding a plurality of magnetic members of substantially inverted U-shape identical with said non-magnetic members in shape and configuration to respective outer sides of said non-magnetic members, bonding a plurality of substantially U-shaped cores each including a horizontal portion with a coil wound thereon and oppositely disposed vertical portions to respective outer sides of said magnetic members in such a manner that said oppositely disposed vertical portions of said magnetic members and said oppositely disposed vertical portions of said cores are positioned against and aligned with each other, cutting off said horizontal members of said magnetic members and said non-magnetic members at said connecting portions, grinding end surfaces of the connecting portions of oppositely disposed vertical portions off said non-magnetic members and said magnetic members at which the horizontal portions have been cut off so as to bring said end surfaces flush with projecting end surfaces of said cores, positioning a plurality of magnetic head half-members identical in shape and configuration which are made by the aforementioned steps in such a manner that their ground end surfaces are disposed in face to face relation with each other, magnetic gaps being formed therebetween, and simultaneously grinding surfaces of said cores, said non-magnetic members, said magnetic members and said shield bonded together in each of said magnetic head half-members which are adapted to come into contact with a magnetic tape.

References Cited

UNITED STATES PATENTS 3,064,333 11/1962 Kristiansen et al. ______ 29—603
3,495,325 2/1970 Bos et al. ____________ 29—603

JOHN F. CAMPBELL, Primary Examiner

C. E. HALL, Assistant Examiner

U.S. Cl. X.R.

179—100.2